United States Patent Office 2,921,924
Patented Jan. 19, 1960

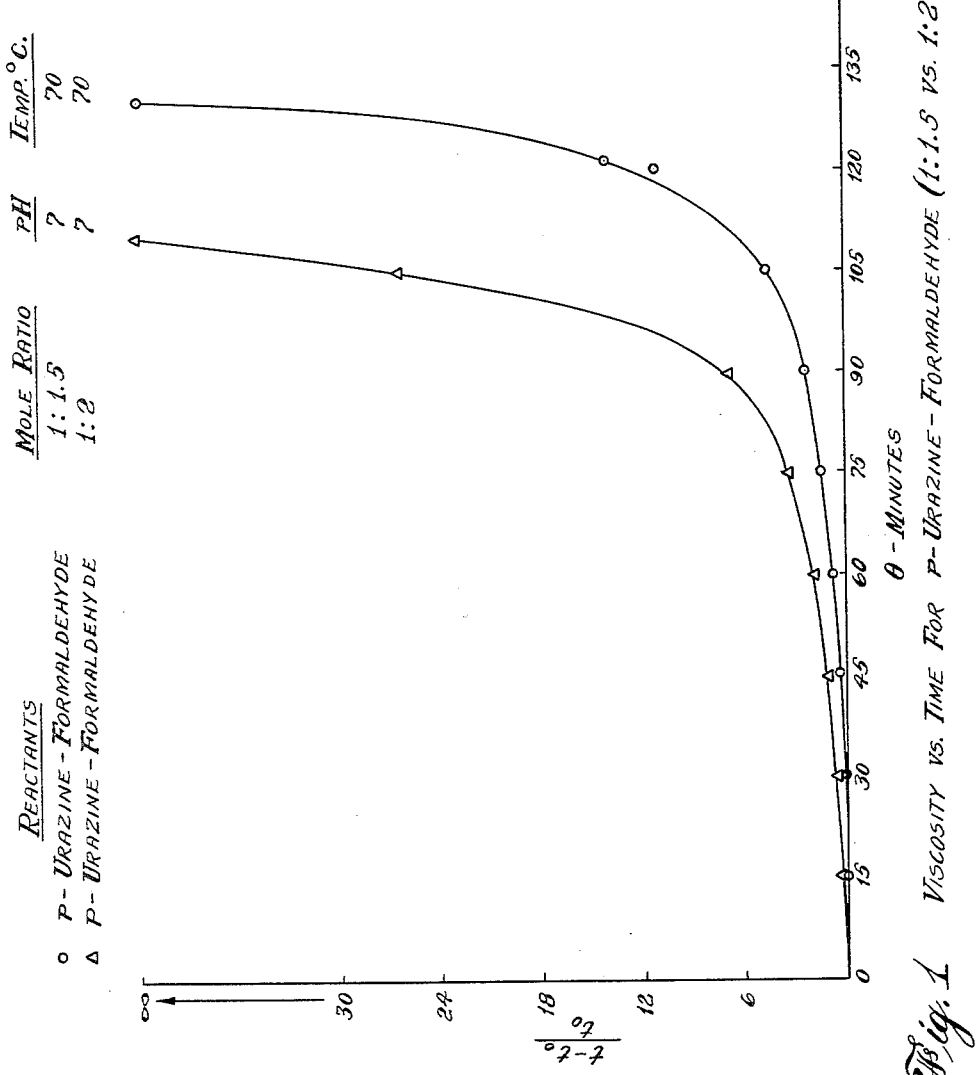

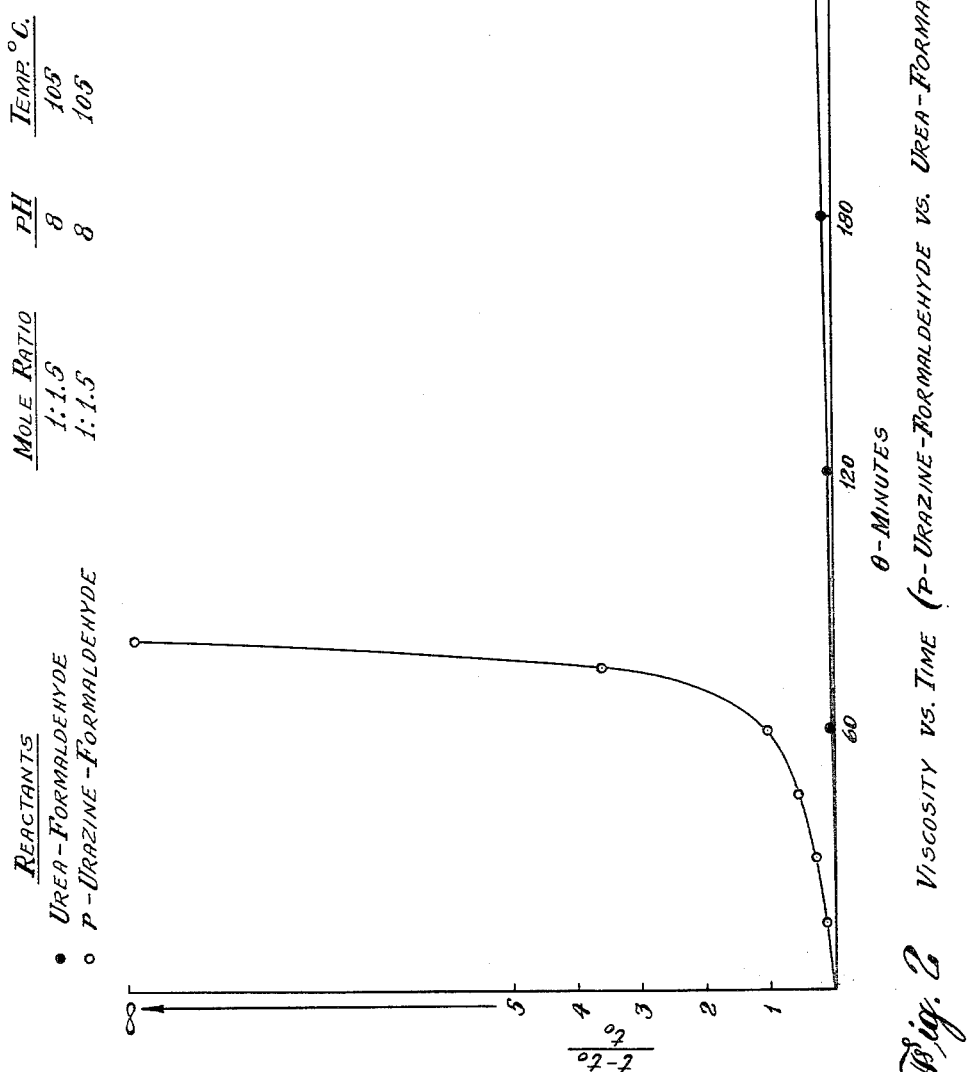

2,921,924

PARA-URAZINE-FORMALDEHYDE RESIN

Vivian T. Stannett, Syracuse, N.Y., and Frederick C. Shibel, Painesville, Ohio, assignors to W. R. Grace & Co., New York, N.Y., a corporation of Connecticut Application February 20, 1958, Serial No. 716,318

5 Claims. (Cl. 260—67.6)

This invention relates to a process for making a new resin; more particularly it pertains to a process for preparing a thermosetting resin from para-urazine and formaldehyde. In addition this invention describes a novel para-urazine formaldehyde resinous product.

Summarily the invention comprises subjecting predetermined amounts of para-urazine and formaldehyde to the action of heat and thereby forming a resinous product all as more fully described hereinafter.

Figures 1 and 2 being graphs of viscosity rates versus time show the rate of formation of the novel resin at two different mole ratios of reactants and a comparison of the novel resin with that of a urea-formaldehyde resin respectively.

The prior art teaches that para-urazine will react with ketones and aldehydes, see Gazz. Chimica It., vol. XXVII, p. 60, wherein A. Purgotti and G. Vigano report that one molecule of para-urazine will react with either one or two molecules of a ketone but with only one molecule of an aldehyde. The products obtained from said reactions were low molecular weight compounds as compared with high molecular weight compounds associated with polymers and resins. Examples of some of the products formed are salicilpara-urazine metanitrobenzalpara-urazine, acetonepara-urazine, and dibenzophenonepara-urazine.

Prior to the present invention, no one had succeeded in preparing a resin from para-urazine and an aldehyde. It has now been found, however, that formaldehyde will form a resin with para-urazine under certain conditions.

The following general procedure was employed to prepare resin-forming mixtures of para-urazine and formaldehyde in the respective mole ratios of 1:1, 1:1.5, and 1:2 which were thereafter used to form resins as described herein. Para-urazine was weighed to the nearest hundredth of a gram and charged to a 20 x 150 mm. Pyrex tube. The amount of para-urazine necessary to make up the 1:1, 1:1.5, and 1:2 para-urazine/formaldehyde mole ratios was 1.47, 0.98, and 0.74 grams respectively. In all examples one cc. of formalin (37% formaldehyde in water) was then measured out and stirred in with the para-urazine. Where necessary to adjust pH, one milliliter of a NaOH or HCl solution was used for each milliliter of formalin employed.

The temperature of the mixture was maintained at room temperature during adjustment of the pH by means of a cooling bath.

The desired reaction temperature was maintained by use of a constant temperature bath. In examples run at a temperature of 105° C., the reaction vessel was fitted with a reflux condenser, to minimize loss of the reactants. A timer was used to measure the reaction time, i.e., the interval between placing the reaction mixture in the constant temperature bath and the time in which the reactants reached the "gel state."

The following examples will aid in describing but do not limit the invention.

EXAMPLE 1

*Resinification of p-urazine-formaldehyde*

0.98 gram of p-urazine were charged to a 20 x 150 mm. Pyrex tube. 1 cc. of 37% formaldehyde was added thereby giving a p-urazine/formaldehyde mole ratio of 1:1.5. The pH was adjusted by adding 1 ml. of sufficient NaOH to make the pH 6. The Pyrex tube was placed in a constant temperature bath which maintained the reactants at a temperature of 60° C. After 10 minutes a water white resin formed which was not tacky.

The reaction between p-urazine-formaldehyde was found to be extremely sensitive to the following variables: pH, temperature, mole ratio, and concentration. As shown in Table I by varying the pH and the temperature, the product obtained can be changed progressively from a milky white solid at a pH of 4 at 60° C., to a clear water white solid at a pH in the range of 5 to 7 at 60° C., to a clear slightly amber solid at a pH of 8 at 105° C., and finally to a clear amber resinous solution at a pH of 9 at 105° C. These results show that the reaction is both acid and base catalyzed. However, reaction times indicate that the reaction is more strongly acid catalyzed. A resin can be obtained by the process of this invention at a pH substantially below 4, but not above a pH of 9.

TABLE I

| Run No. | P-urazine formaldehyde Mol Ratio | pH | ° C. Temp. | Reaction Time (Min.) | Product |
|---|---|---|---|---|---|
| 1 | 1:1.5 | 4 | 60 | 10 | Milky white solid. |
| 2 | 1:1.5 | 5 | 60 | 3 | Water white resin. |
| 3 | 1:1.5 | 6 | 60 | 10 | Do. |
| 4 | 1:1.5 | 7 | 60 | 310 | Do. |
| 5 | 1:1.5 | 7 | 70 | 140 | Do. |
| 6 | 1:1.5 | 7 | 80 | 100 | Do. |
| 7 | 1:1.5 | 6 | 90 |  | Immediate formation of water white resin. |
| 8 | 1:1.5 | 7 | 90 | 15 | Water white resin. |
| 9 | 1:1.5 | 8 | 105 | 80 | Slightly amber resin. |
| 10 | 1:2 | 6 | 60 | 15 | Milky white resin. |
| 11 | 1:2 | 7 | 60 | 110 | Water white resin. |
| 12 | 1:2 | 7 | 70 | 105 | Do. |
| 13 | 1:2 | 7 | 80 | 65 | Do. |
| 14 | 1:2 | 9 | 105 | 65 | Clear yellow-green resin. |

EXAMPLE 2

*Resinification reaction rate of p-urazine-formaldehyde*

A rate study of viscosity (proportional to chain growth) versus time was made to compare the reactions of p-urazine-formaldehyde at mole ratios of 1:1.5 and 1:2. The following procedure was used. The reactions were performed in Oswald viscosimeters and heated by means of a constant temperature bath. Viscosity was determined periodically until the solution approached the gel state. At this point the material was transferred to a glass tube in the constant temperature bath and allowed to continue reacting until the resin gelled at which time the viscosity was considered infinite. Both runs were made at a pH of 7 and at a temperature of 70° C. The data shown in Table II was plotted in Figure 1. As expected, the viscosity vs. time curves of these two mole ratios were similar but the 1:2 mole ratio curve exhibited a faster reaction rate throughout. Gelation of the solution resulted 20 minutes sooner in the 1:2 as compared to the 1:1.5 mole ratio.

TABLE II
[Viscosity vs. time for p-urazine-formaldehyde at pH of 7 and reaction temperature of 70° C.]

| Mole Ratio 1:2 | | | Mole Ratio 1:1.5 | | |
|---|---|---|---|---|---|
| $\theta$ Time (Min.) | $t$—Min. (Visc.) | $\frac{t-t_0}{t_0}$ | $\theta$ Time (Min.) | $t$—Min. (Visc.) | $\frac{t-t_0}{t_0}$ |
| $\theta=0$ | 0.02($=t_0$) | 0 | 0 | 0.03($=t_0$) | 0 |
| 15 | 0.025 | 0.25 | 15 | 0.03 | 0 |
| 30 | 0.03 | 0.50 | 30 | 0.03 | 0 |
| 45 | 0.04 | 1.00 | 45 | 0.04 | 0.33 |
| 60 | 0.06 | 2.00 | 60 | 0.05 | 0.67 |
| 75 | 0.09 | 3.5 | 75 | 0.07 | 1.33 |
| 90 | 0.16 | 7.0 | 90 | 0.09 | 2.00 |
| 105 | 0.55 | 26.5 | 105 | 0.16 | 4.33 |
| 110 | (¹) | ∞ | 120 | 0.37 | 11.33 |
|  |  |  | 122 | 0.55 | 14.00 |
|  |  |  | 130 | (¹) | ∞ |

¹ Gelation.

EXAMPLE 3

*Comparison of reaction rates of p-urazine-formaldehyde and urea-formaldehyde*

A rate study of viscosity (proportional to chain growth) versus time using the same procedure as that explained in Example 2 was undertaken to compare the reaction rate of p-urazine-formaldehyde with that of urea-formaldehyde. Both runs were made under the same conditions, i.e., a mole ratio of 1:1.5 at a pH of 8 at 105° C. Table III evidences the data plotted in Figure 2. Gelation of the p-urazine-formaldehyde condensation reaction was complete in 80 minutes, following an exponential curve. During the same time interval the viscosity of the solution formed by the urea-formaldehyde condensation reaction had only increased approximately 10%. This comparison reveals the extremely fast formation rate of this novel resin.

TABLE III
[Viscosity vs. time p-urazine-formaldehyde vs. urea-formaldehyde.]

| P-Urazine-Formaldehyde | | | Urea,Formaldehyde | | |
|---|---|---|---|---|---|
| $\theta$ Time, Min. | $t$—Min. (Visc.) | $\frac{t-t_0}{t_0}$ | $\theta$ Time, Min. | $t$—Min. (Visc.) | $\frac{t-t_0}{t_0}$ |
| $\theta=0$ | 0.23($=t_0$) | 0 | 0 | 0.11 | 0 |
| 15 | 0.26 | 0.13 | 60 | 0.12 | 0.09 |
| 30 | 0.31 | 0.35 | 120 | 0.12 | 0.09 |
| 45 | 0.36 | 0.57 | 180 | 0.13 | 0.18 |
| 60 | 0.48 | 1.09 | 240 | 0.14 | 0.27 |
| 75 | 1.07 | 3.66 |  |  |  |
| 80 | Gel. | ∞ |  |  |  |

It can be seen from Table III, that even at a pH of 8 very rapid condensation of p-urazine and formaldehyde to a resin takes place. This rapid cure compared with urea-formaldehyde resins indicates the value of p-urazine-formaldehyde resins as wet strength resins for paper, where the rapid development of wet strength is essential.

EXAMPLE 4

*Solubility of p-urazine-formaldehyde resin*

A p-urazine-formaldehyde resin produce from the reactants in a 1:1.5 mole ratio was tested for solubility in the gel state and the final cross-linked state in various solvents, the results of which are shown in Table IV. The cross-linked state of the resin was obtained by heating gel state resin overnight at 100° C. The gel state resin was soluble in water, partially soluble in chloroform and insoluble in the remaining solvents. The cross-linked resin was insoluble in all eight solvents, which phenomena of insolubility is typical of thermosetting resins.

TABLE IV.—SOLUBILITY OF THE P-URAZINE-FORMALDEHYDE RESIN IN "GEL" AND "CROSS-LINKED" STAGES

| Solvent | | "Gel Stage" | "Cross-Linked Stage" (Ground Resin) |
|---|---|---|---|
| H₂O | Room temp | P. sol | Insol. |
|  | B. pt | Sol | Insol. |
|  | After cooling | Sol | Insol. |
| Toluene | Room temp | Insol | Insol. |
|  | B. pt., 110.8° C | Insol | Insol. |
|  | After cooling | Insol | Insol. |
| Methyl Alcohol | Room temp | Insol | Insol. |
|  | B. pt., 64.7° C | Insol | Insol. |
|  | After cooling | Insol | Insol. |
| Butyl Alcohol | Room temp | Insol | Insol. |
|  | B. pt., 117° C | Insol | Insol. |
|  | After cooling | Insol | Insol. |
| Chloroform | Room temp | P. sol | Insol. |
|  | B. pt., 61.2° C | P. sol | Insol. |
|  | After cooling | P. sol | Insol. |
| Methylethyl ketone | Room temp | Insol | Insol. |
|  | B. pt., 79.6° C | Insol | Insol. |
|  | After cooling | Insol | Insol. |
| Dioxane | Room temp | Insol | Insol. |
|  | B. pt., 101.1° C | Insol | Insol. |
|  | After cooling | Insol | Insol. |
| Dimethylformamide | Room temp | Insol | Insol. |
|  | B. pt., 153° C | Insol | Insol. |
|  | After cooling | Insol | Insol. |

EXAMPLE 5

*Molding of p-urazine-formaldehyde resin*

Molding properties of a p-urazine-formaldehyde gel state resin (mole ratio 1:1.5) were studied using a 10 ton hand operated press, e.g., a Carver laboratory hydraulic press. A standard Carver test cylinder (1⅛ inch diameter by 3 inches deep) was used to house the resin charge. The test cylinder was surrounded by a heated jacket. When the apparatus was heated to a temperature of 150° C., the resin in the gel state was added to the test cylinder. The cylinder was placed in the heated jacket and placed between the heated press plates. Using only sufficient pressure to insure intimate contact between the mold and the plates and maintaining a temperature of 150° C. for 3 hours resulted in the formation of a clear semi-vitreous cylindrical shaped resin. In subsequent runs using the same procedure as above, increasing the temperature to 220° C. resulted in discoloration of the resin, and still higher temperatures promoted decomposition.

EXAMPLE 6

*Thermal stability of p-urazine-formaldehyde resin*

Tests were made of p-urazine-formaldehyde resin (mole ratio 1:1.5), in the syrup state, the gel state, and the cross-linked state. The syrup state is the state the reactants reach after initial reaction but prior to gelation. The results are reported in Table V. The phenomena of the cross-linked resin to decompose without melting is typical of the thermosetting resins.

TABLE V.—THERMAL STABILITY OF P-URAZINE-FORMALDEHYDE
[Mole ratio 1:1.5]

| Syrup Stage (Resin I) | Gel State (Resin II) | Cross-Linked State (Resin III) (Ground Resin) |
|---|---|---|
| Water can be driven off at 100° C, with the resultant formation of a clear water white resin (Resin III). | The gelled mass reverts back to the syrup state (Resin I) when heated at 70° C. This then proceeds at the syrup stage, from which Resin III can be formed if desired. | Resin III starts to discolor at 220° C. and decomposes, without ever melting at 255° C. |

EXAMPLE 7

Molding a saucer

A weighed quantity of p-urazine-formaldehyde resin in the gel state and wood flour in a 70:30 weight ratio was admixed by hand and placed in the lower half of a mold cavity of a compression molding machine precoated with zinc stearate and preheated to a temperature of 150° C. The mold is slowly closed until the material starts to flow at which time the rate of closing of the mold is slowed to nearly an imperceptible speed. After the excess material has flashed out and the upper part of the mold (punch) has seated on the cut off areas (lands) of the cavity, the mold is held closed under a pressure of 3000 pounds per square inch for 10 minutes (cure period). The cure period is dependent upon various factors, namely, speed of cure of the molding compound, thickness of the molded piece, overall size of the piece and temperature. After curing the mold is opened and a saucer is ejected by knock-out pins.

As shown in Example 7, the resin can be used in the molding industry and also as surface coating for articles such as ornamental or functional objects. Other uses for which the novel resin is applicable are bottle closures, tableware, panel boards, wood bonding, and the like.

EXAMPLE 8

Wet strength paper

Two grams of p-urazine-formaldehyde resin prepared as in Example 3 was dissolved in 100 cc. of water. Pieces of unbleached kraft paper were saturated in the resin solution and dried for 1 hour at 60° C. and then tested for wet and dry tensile strength. The paper retained 38% of its dry strengh after soaking for 24 hours in cold water.

We claim:

1. A process of preparing a resin that comprises subjecting p-urazine to the action of formaldehyde in a p-urazine:formaldehyde mole ratio of about 1:1–2, at a pH of about 4–9, and at a temperature of about 60°–105° C., and recovering the thus-formed resin.

2. The process according to claim 1 wherein the reaction is carried out in an aqueous solution.

3. The process according to claim 2 wherein the formaldehyde is in molar excess over p-urazine.

4. The process according to claim 3 wherein the p-urazine-formaldehyde mole ratio is in the range of 1:1.5–2.

5. The process of preparing a resin that comprises subjecting p-urazine to the action of formaldehyde in a p-urazine:formaldehyde mole ratio of 1:1.5, at a pH of 6, and at a temperature of 90° C., and recovering the thus-formed resin.

References Cited in the file of this patent

UNITED STATES PATENTS

| | | |
|---|---|---|
| 2,369,371 | Seiberlich | Feb. 13, 1945 |
| 2,589,290 | Sampson | Mar. 18, 1952 |

OTHER REFERENCES

Erickson et al.: "Heterocyclic Compounds—The 1,2,3- and 1,2,4-Triazines, Tetrazines and Pentazines," Interscience Publ. Col., N.Y. (1956), page 192. Copy in book in Div. 6.)